June 30, 1936.  G. M. VANCE ET AL  2,046,098
OIL HEATING APPARATUS
Filed Dec. 24, 1934  2 Sheets-Sheet 2
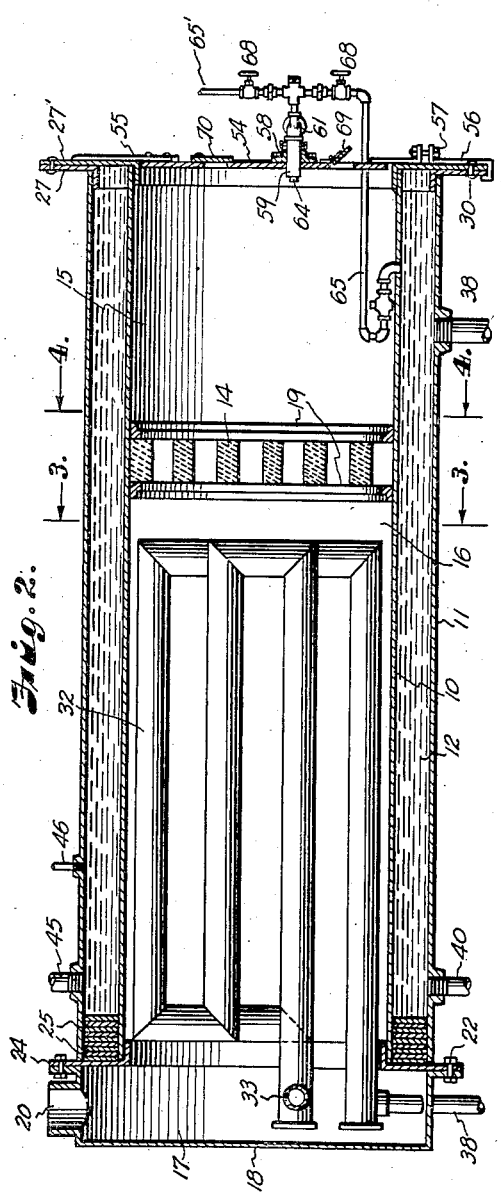
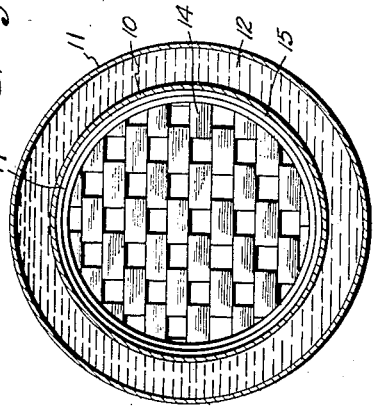
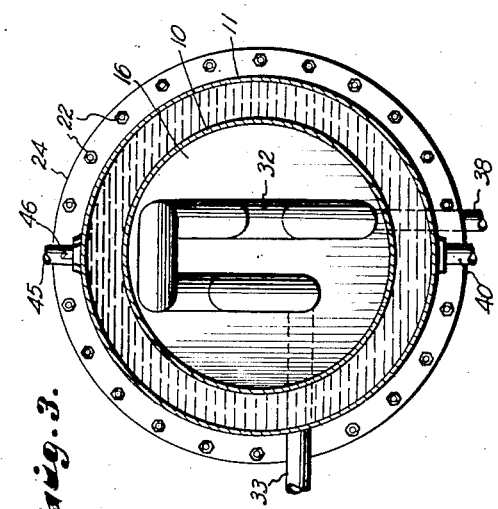
INVENTORS:
Glenroie M. Vance
and Leonard R. Vance
BY
ATTORNEY.

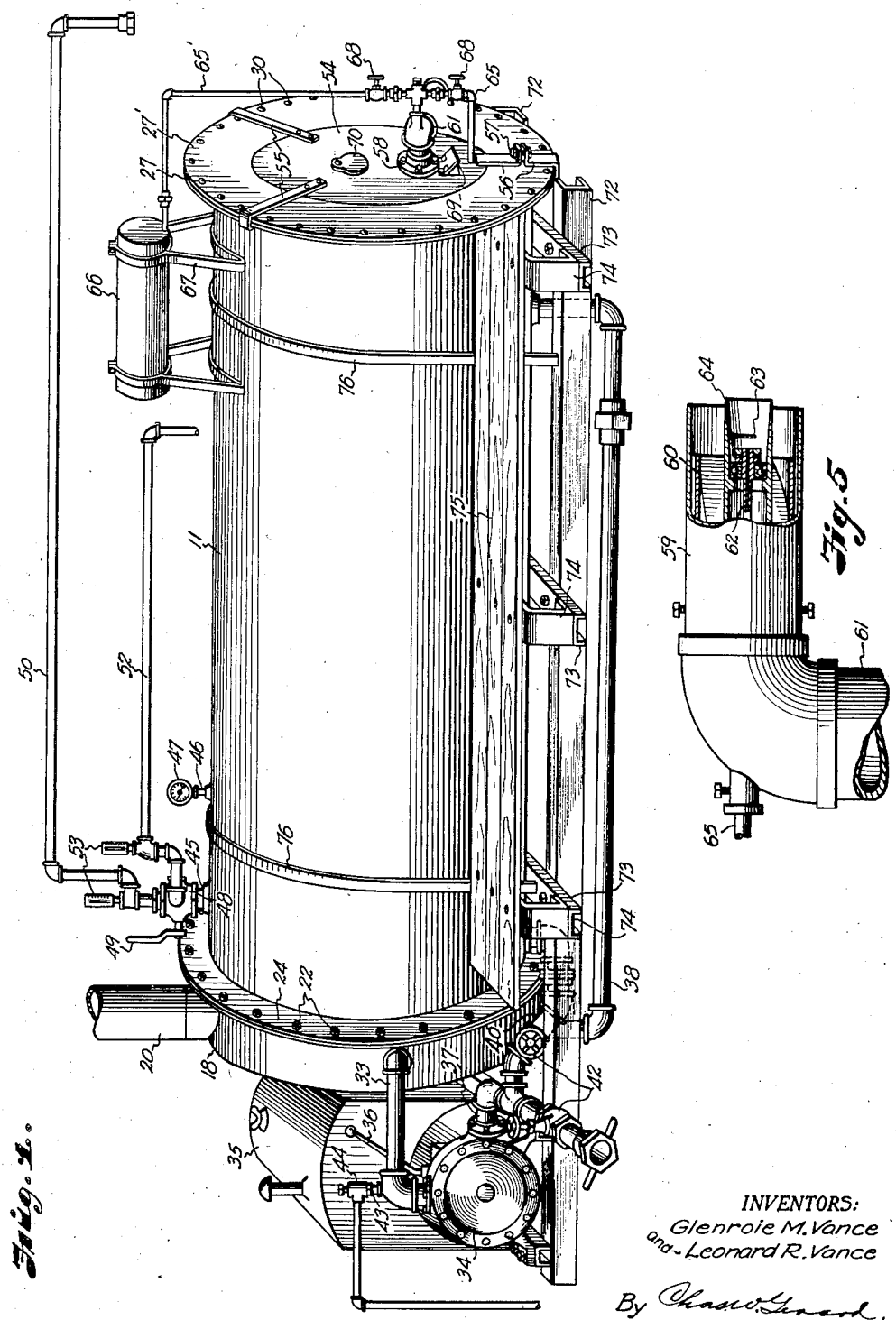

Patented June 30, 1936

2,046,098

UNITED STATES PATENT OFFICE 2,046,098

OIL HEATING APPARATUS

Glenroie M. Vance and Leonard R. Vance,
Kansas City, Mo.

Application December 24, 1934, Serial No. 759,041

3 Claims. (Cl. 122—140)

The present invention relates to apparatus for the heating of bituminous materials, and aims to provide a unitary apparatus of this character whereby such products may be effectively heated to the desired temperatures, and which will include provision for the efficient handling of the material from a supply or storage tank and back to the same supply source or to other points, as desired.

For this purpose we have devised a heating apparatus in which the material to be heated is drawn from the supply source and so circulated and heated as to eliminate any objectionable tendency to become changed more or less into coke, such as is usually experienced in heating operations of this kind. We accomplish this by keeping the material moving sufficiently fast in those parts of the apparatus where it is subjected to the intensest heat, while slower movement is permitted the flow of the material in other relatively less intensely heated portions of the apparatus.

Provision is also made for appropriate adjustment and control of the functions of the apparatus, as well as for such recirculation of the material as may be desired for causing the same to attain a sufficiently high temperature for some of the uses to which the material is to be put. The apparatus is also arranged and constructed to compensate for differences in expansion and contraction due to temperature changes in operation, and also to permit the use of the material being handled for supplying the fuel to the burner equipment which generates the heat for the heating function of the apparatus.

With the foregoing general objects in view, the invention will now be described by reference to the accompanying drawings illustrating suitable equipment which we have devised and found practicable for the embodiment of the proposed improvements, after which those features and combinations deemed to be novel and patentable will be particularly set forth and claimed.

In the drawings—

Figure 1 is a perspective view showing a heating apparatus for bituminous materials, constructed in accordance with the present invention;

Figure 2 is a vertical sectional view, through the heater structure proper;

Figures 3 and 4 are transverse sectional views, representing sections taken on the lines 3—3 and 4—4 of Figure 2, respectively; and Figure 5 is an enlarged detail view of the burner forming part of the apparatus.

Referring now to the said drawings in detail, these illustrate the improved apparatus as comprising a tank structure made up of inner and outer cylindrical walls 10, 11, respectively, arranged in concentric relation to provide an annular heating space or chamber 12 between them.

The space inside the inner cylinder 10 is divided by a fire-brick checkerwork structure 14 into a burner compartment 15 and a coil compartment or chamber 16 communicating with a smoke box 17 formed by a housing 18 provided with the stack outlet 20, as shown in Figure 2. The checkerwork 14 is retained in place by means of a pair of spaced interior rings 19, while the housing 18 is secured by bolts 22 to a flanged ring plate 24; and this plate 24 and the adjacent ends of the cylindrical walls 10, 11, are welded together around a laminated steel ring plate structure 25 to form a rigid joint at this end of the tank structure. At the opposite end of said tank structure the ends of the cylinders 10 and 11 have secured thereto, as by welding, the flanged ring plates 27, 27', in overlapping relation to the extreme outer edges of which plates 27, 27', are suitably welded together as well as further secured together by means of rivets 30 adjacent to said outer edges. This obviously provides a joint structure at this end of the tank which permits compensation for differences in the contraction and expansion of the inner and outer cylindrical walls resulting from the inner cylinder being subjected to relatively higher temperatures.

Inside the chamber 16 is arranged a coil assembly 32 provided with a horizontal pipe connection 33 to a suitable pump 34 operated from an engine or motor 35 which is provided with the clutch control lever 36. The intake of said pump connects with a pipe line 37 through which the supply of bituminous material is introduced to the pump and thereby forced into the apparatus for heating purposes. The other end of the coil assembly 32 is connected by a pipe 38 with the annular heating space or chamber 12 (between the cylinders 10, 11) at a point below the burner chamber 15, while at its opposite end, below the coil chamber 16 the said chamber 12 is provided with a pipe 40 connecting it with the pump intake pipe 37, for flow re-circulating purposes as hereinafter explained. Each of said pipes 37 and 40 is provided with a suitable gate valve control 42, as shown, for cutting off or regulating the flow through the pipes, while the pipe 33 may also have a branch pipe 43 fitted with a pressure relief valve 44 as a safety device in case of any clogging of the outlets from the heater structure.

The outlet from the heating chamber 12 comprises a pipe connection 45 over the coil chamber 16, adjacent to which may be provided a connection 46 with a suitable pressure gage 47. The pipe 45 connects with a three-way valve 48 having the operating handle 49 for directing the heated output either back to the supply tank by way of a pipe 50 or through a service pipe 52 to a delivery truck or other point of use, as desired.

Suitable thermometers 53 may be mounted on the respective outlet pipes 50 and 52, as shown.

The burner chamber 15 is closed by means of a removable door plate 54 held in place by suitable hanger straps 55 and a sectional clamp 56 engaging the outer edges of the plates 27, 27', the said clamp 56 being fitted with a securing bolt 57. Through an opening 58 in the door plate 54 is fitted a liquid fuel burner which may be of any preferred type, such as a construction comprising a housing 59 with rotating vanes 60 impelled by air-blast entering through a duct 61,—the liquid fuel entering by way of a duct 62 terminating opposite a baffle plate 63 located in the rotating atomizing cup member 64. The liquid fuel may be supplied the burner either from a pipe 65 leading from the heating chamber 12, or from a pipe 65' connecting with an auxiliary fuel tank 66 which may be supported by framework 67 over the outer cylinder 11, as shown in Figure 1, said fuel pipes 65 and 65' being equipped with suitable valves 68. The door plate 54 also carries appropriate damper plates 69 and 70 as required for draft and inspection purposes.

Any desired form of supporting framework may be used for the mounting of the described equipment, such as bed channels 72 provided with cross frame pieces 73, together with bracket members 74 for carrying the running board platforms, as shown in Figure 1,—suitable bands 76 being employed to anchor the tank structure down upon said framework.

In the operation of the apparatus, the burner may be supplied with fuel initially from the auxiliary tank 66 until the contents of the tank structure have been sufficiently warmed, after which the fuel for the burner's operation may be derived from the tank supply, i. e., by way of the pipe 65. The operation of the burner heats up the burner chamber 15 as well as the checkerwork 14, through which the flames are distributed throughout the coil chamber 16 and around the coil assembly 32. As it is around these coils that the heat reaches its greatest intensity it will be seen that as the pump drives the bituminous material through the pipe 33 into and through the coils 32 the flow of said material will be most rapid through the coil assembly, which rapid movement of the bituminous material through the region of the highest temperatures serves to obviate any objectionable tendency of the material to become converted into coke and thereby clog up the passages. From the coil assembly the material is driven through the connection 38 into the annular heating chamber 12, which it enters at its relatively cooler end and leaves by way of the outlet 45 at the relatively hotter end at the top of the cylinder 11 over the coil chamber. In this passage through said annular chamber where the heating surfaces are not maintained so hot as the coils 32, a relatively slower movement of the material may be permitted than that which is required of it in passing through the coils, without danger of coking.

The provision of the by-pass connection 40 enables all or any part of the flow through said annular chamber 12 to be recirculated through the heating coils and space 12, by proper regulation of the valve 42 in the pipe 40, for the purpose of reheating the material and raising it to any desired temperature within the limits of the heating capacity of the apparatus.

It is therefore apparent that we have devised a practical and efficient apparatus for carrying out the desired objects of our invention, and that by the use of the same the material to be handled may be drawn from a railroad tank car or other storage tanks, heated to any temperature which is desired, and then returned to the tank car or other tank structures such as delivery trucks or to servicing connections,—all in one continuous operation.

While the foregoing represents what we now regard as our preferred form of apparatus designed for the embodiment of our improvements, we desire to be understood as expressly reserving the right to make whatever changes or modifications may be fairly deemed to fall within the spirit and scope of the appended claims.

Having thus described our invention, what we claim and desire to secure by Letters Patent is:—

1. Oil heating apparatus comprising, spaced outer walls forming an outer annular heating chamber, a checkerwork wall dividing the interior of the apparatus into a coil compartment and a burner compartment, a coil assembly in said coil compartment provided with means for producing a flow therethrough of the material to be heated, a burner in said burner compartment operating to direct the flames therefrom through said checkerwork and around said coil assembly, inlet and outlet connections for said outer heating chamber beneath the burner compartment and above the coil compartment respectively, and means for connecting the discharge end of said coil assembly with the inlet to said outer heating chamber.

2. Apparatus for the heating of bituminous and like materials comprising, spaced outer walls forming an outer annular heating chamber, a checkerwork wall dividing the interior of the apparatus into a coil compartment and a burner compartment, a coil assembly in said coil compartment provided with pumping means for producing a flow therethrough of the material to be heated, a burner in said burner compartment operating to direct the flames therefrom through said checkerwork and around said coil assembly, means providing inlet and outlet connections for said outer heating chamber, a connection between the discharge end of said coil and the inlet to said outer chamber, and a valved fluid-circulating connection between said pumping means and one end of said outer heating chamber.

3. Apparatus of the character described comprising, spaced outer walls forming an outer annular heating chamber, a checkerwork wall dividing the interior of the apparatus into a coil compartment and a burner compartment, a coil assembly in said coil compartment, a burner in said burner compartment operating to direct the flames therefrom through said checkerwork and around said coil assembly, inlet and outlet connections for said outer heating chamber beneath the burner compartment and above the coil compartment respectively, means for connecting the discharge end of said coil assembly with the inlet to said outer heating chamber, a pump having its discharge outlet connected with the intake end of said coil assembly, and a communicating connection between the intake of said pump and said outer heating chamber opposite to said outlet connection from said outer chamber.

GLENROIE M. VANCE.
LEONARD R. VANCE.